United States Patent
Lee et al.

(10) Patent No.: US 12,551,452 B2
(45) Date of Patent: Feb. 17, 2026

(54) KIT FOR PREPARING NANOPARTICLE COMPOSITION FOR DRUG DELIVERY, COMPRISING POLYLACTIC ACID SALT

(71) Applicant: SAMYANG HOLDINGS CORPORATION, Seoul (KR)

(72) Inventors: So Jin Lee, Seoul (KR); Sang Hoon Kim, Yongin-si (KR); Joon Young Park, Seoul (KR); Hye Yeong Nam, Seongnam-si (KR); Ji Yeon Son, Daejeon (KR)

(73) Assignee: SAMYANG HOLDINGS CORPORATION, Seoul (KR)

( * ) Notice: Subject to any disclaimer, the term of this patent is extended or adjusted under 35 U.S.C. 154(b) by 685 days.

(21) Appl. No.: 17/787,156

(22) PCT Filed: Dec. 16, 2020

(86) PCT No.: PCT/KR2020/018480
§ 371 (c)(1),
(2) Date: Jun. 17, 2022

(87) PCT Pub. No.: WO2021/125805
PCT Pub. Date: Jun. 24, 2021

(65) Prior Publication Data
US 2023/0039124 A1  Feb. 9, 2023

(30) Foreign Application Priority Data
Dec. 20, 2019  (KR) .................. 10-2019-0171528

(51) Int. Cl.
*A61K 9/51* (2006.01)
*A61K 45/06* (2006.01)

(52) U.S. Cl.
CPC .......... *A61K 9/5192* (2013.01); *A61K 9/5153* (2013.01); *A61K 45/06* (2013.01)

(58) Field of Classification Search
CPC ..... A61K 9/5192; A61K 9/5153; A61K 45/06
See application file for complete search history.

(56) References Cited

U.S. PATENT DOCUMENTS

| | | |
|---|---|---|
| 2002/0072121 A1 | 6/2002 | Lam et al. |
| 2005/0287196 A1 | 12/2005 | Cho et al. |
| 2018/0344638 A1 | 12/2018 | Nam et al. |

FOREIGN PATENT DOCUMENTS

| | | | |
|---|---|---|---|
| CN | 108366964 A | 8/2018 | |
| EP | 3 357 491 A1 | 8/2018 | |
| JP | H05-111524 A | 5/1993 | |
| JP | 2002-542341 A | 12/2002 | |
| KR | 10-2004-0021760 A | 3/2004 | |
| KR | 10-2011-0077818 A | 7/2011 | |
| KR | 10-2019-0127277 A | 11/2019 | |
| WO | WO 00/62813 A2 | 10/2000 | |
| WO | WO-2014197640 A1 * | 12/2014 | ......... A61K 31/4725 |
| WO | WO-2017048018 A1 * | 3/2017 | ............ A61K 48/00 |
| WO | WO 2017/105138 A1 | 6/2017 | |
| WO | WO-2018088719 A1 * | 5/2018 | ............ A61K 48/00 |
| WO | WO 2018-220553 A1 | 12/2018 | |
| WO | WO 2019/212288 A1 | 11/2019 | |

OTHER PUBLICATIONS

Machine translation of WO-2017048018-A1 (Year: 2017).*
Machine translation of WO-2018088719-A1 (Year: 2018).*
Extended European Search Report for European Application No. 20901243.4, dated Dec. 19, 2023.
International Search Report (PCT/ISA/210) issued in PCT/KR2020/018480 dated Mar. 22, 2021.

* cited by examiner

*Primary Examiner* — Robert A Wax
*Assistant Examiner* — John W Lippert, III
(74) *Attorney, Agent, or Firm* — Birch, Stewart, Kolasch & Birch, LLP

(57) ABSTRACT

The present invention relates to a kit for preparing a nanoparticle composition for drug delivery and, more specifically, to a kit for preparing a nanoparticle composition for drug delivery, which is designed to easily form a nanoparticle in which a drug is encapsulated by simply mixing an amphiphilic block copolymer, a cationic compound, a polylactic acid salt, and the drug that are the components of the kit.

12 Claims, 3 Drawing Sheets

[FIGURE 1]
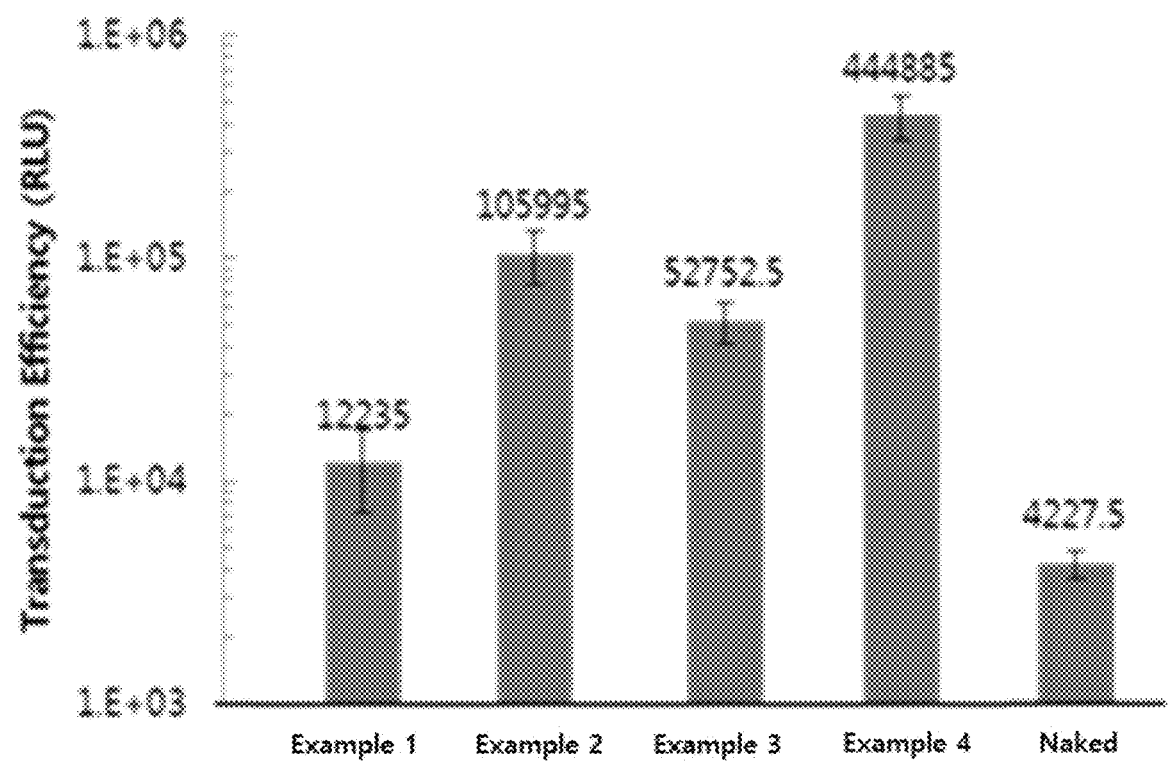
[FIGURE 2]
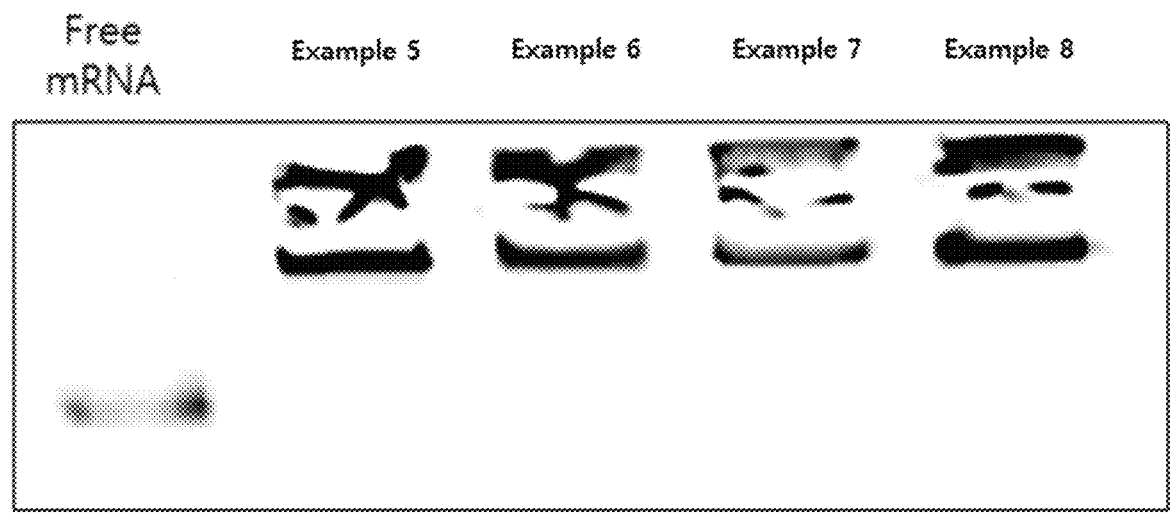

[FIGURE 3]
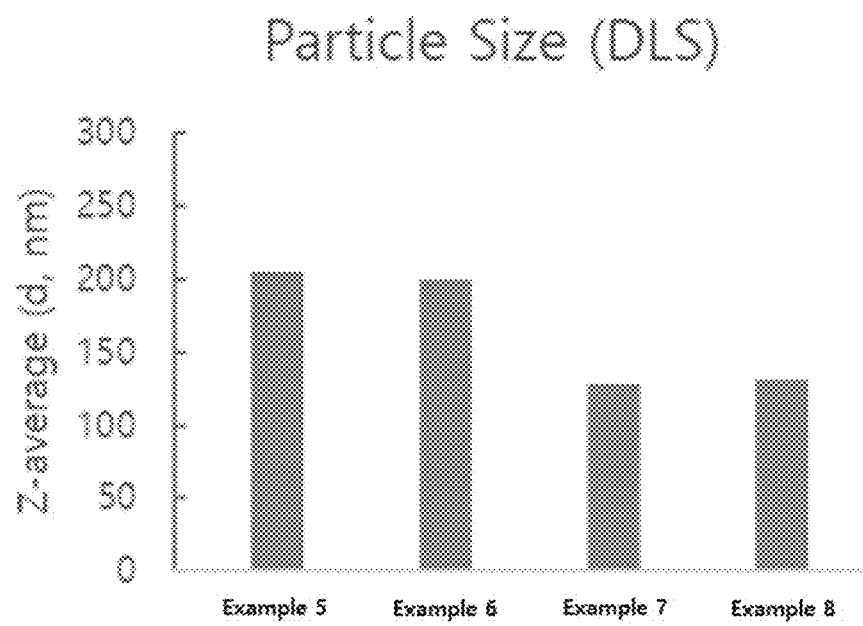
[FIGURE 4]
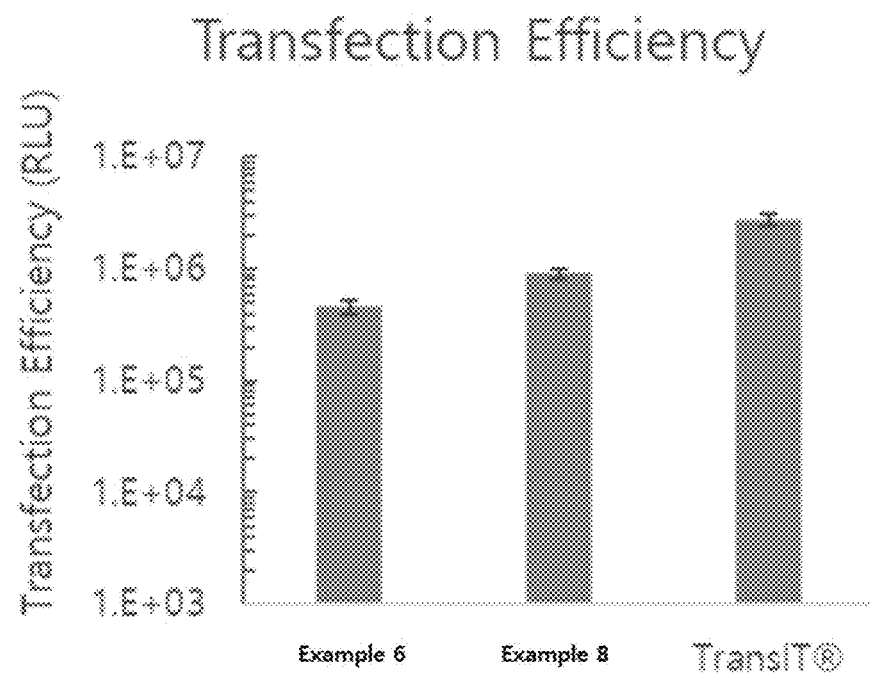

[FIGURE 5]
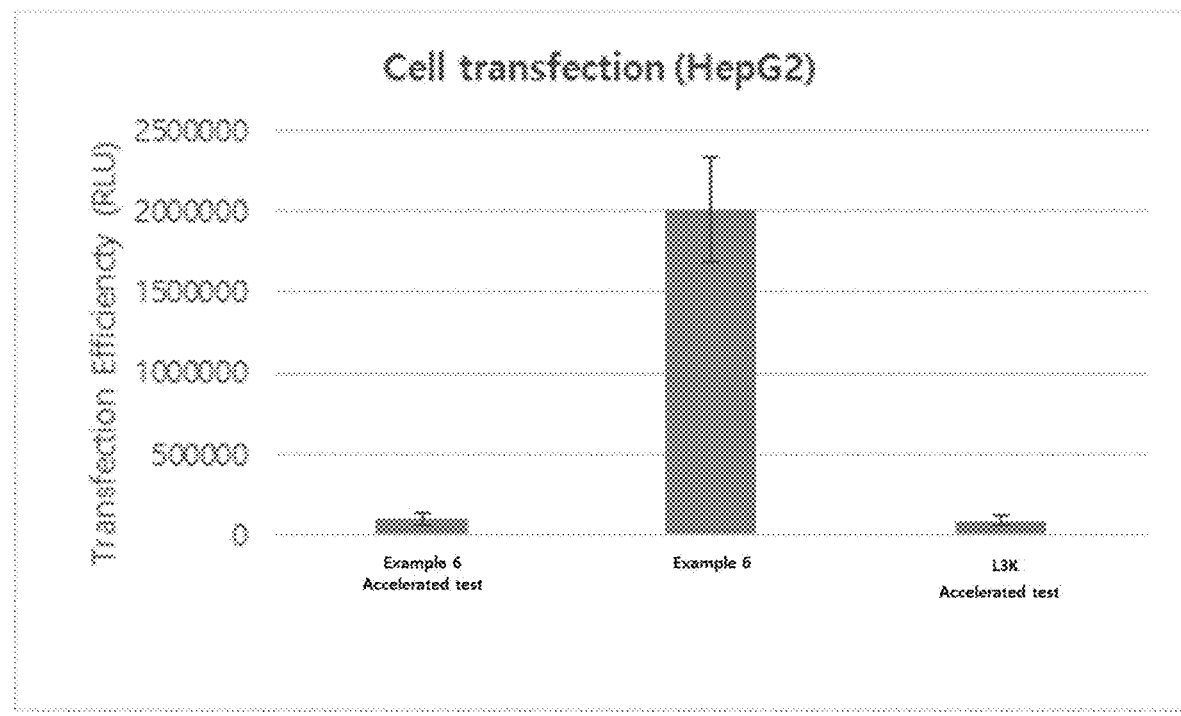

_KIT FOR PREPARING NANOPARTICLE COMPOSITION FOR DRUG DELIVERY, COMPRISING POLYLACTIC ACID SALT_

TECHNICAL FIELD

The present invention relates to a kit for preparing nanoparticle composition for drug delivery, and more specifically, a kit for preparing nanoparticle composition for drug delivery designed so that it can easily form nanoparticles in which drug is encapsulated only by simple mixing of the components of the kit which are amphiphilic block copolymer, cationic compound, salt of polylactic acid and drug.

BACKGROUND ART

In therapies using anionic drugs including nucleic acid, technologies for safe and efficient drug delivery have been researched for a long time, and various carriers and techniques for delivery have been developed. Carriers are mainly divided into viral carriers utilizing adenovirus, retrovirus or the like, and non-viral carriers utilizing cationic lipid, cationic polymer or the like. Viral carriers are known as being exposed to risks such as non-specific immune response, etc. and having many problems in commercialization due to the complexity of the production process. Thus, recent researches proceed in the direction to improve such disadvantages by using non-viral carriers. In comparison with viral carriers, non-viral carriers have advantages of fewer side effects in terms of in vivo safety, and lower production cost in terms of economy.

The representative non-viral carriers for delivering nucleic acid material are a complex of cationic lipid and nucleic acid (lipoplex) and a complex of polycationic polymer and nucleic acid (polyplex). Such a cationic lipid or polycationic polymer stabilizes anionic drug by forming a complex through electrostatic interaction with the anionic drug and increases intracellular delivery, and for these reasons, various researches thereof have been conducted (De Paula D, Bentley M V, Mahato R I, Hydrophobization and bioconjugation for enhanced siRNA delivery and targeting, RNA 13 (2007) 431-56; Gary D J, Puri N, Won Y Y, Polymer-based siRNA delivery: Perspectives on the fundamental and phenomenological distinctions from polymer-based DNA delivery, J Control release 121 (2007) 64-73).

However, the nanoparticles formed from such a complex frequently lose stability easily according to the storage environment, and thus they are vulnerable to long-term storage and the quality may be damaged during transportation. In addition, since a complicated production process is necessary for securing sufficient stability, the production is very demanding.

Therefore, is has been requested to develop a kit for preparing nanoparticle composition for drug delivery, which is not significantly affected by the storage environment and can be easily used by an end user.

CONTENTS OF THE INVENTION

Problems to be Solved

The purpose of the present invention is to provide a kit for preparing nanoparticle composition for drug delivery, which can easily form drug-containing nanoparticles only by simple mixing of the components of the kit and thus can be easily used by an end user, and can form drug-containing nanoparticles immediately before the use and thus can effectively deliver the drug into the body without influence according to the storage or transportation environment.

Technical Means

To achieve the above purpose, the present invention provides a kit for preparing nanoparticle composition, comprising: a first chamber comprising amphiphilic block copolymer, cationic compound and salt of polylactic acid; and a second chamber comprising effective ingredient selected from nucleic acid, polypeptide, virus or combination thereof.

In an embodiment, the kit is to form nanoparticles for intracellular delivery of the effective ingredient.

In an embodiment, one or more selected from the group consisting of the first chamber and the second chamber further comprise additional solvent.

In an embodiment, the solvent is aqueous solvent, water miscible solvent, or a mixture thereof.

In an embodiment, the second chamber further comprises pH adjusting agent, inorganic salt, saccharide, surfactant, chelating agent, or a combination thereof.

In an embodiment, the amount of the amphiphilic block copolymer may be 0.01 to 50 parts by weight, based on 1 part by weight of the cationic compound.

In an embodiment, the amount of the salt of polylactic acid may be 0.1 to 100 parts by weight, based on 1 part by weight of the cationic compound.

In an embodiment, the mixture of the amphiphilic block copolymer, cationic compound and salt of polylactic acid in the first chamber may be that filtered one or more times with hydrophilic filter after the mixing.

Effect of the Invention

In the kit for preparing nanoparticle composition according to the present invention, the components to form drug-containing nanoparticles are isolated and contained in separate chambers, and thus unlike nanoparticles that have already formed, there is no influence by the storage or transportation environment, and by using the kit, an end user can successfully form nanoparticles having effective drug delivery effect only by simple mixing of the components of the chambers.

BRIEF EXPLANATION OF THE DRAWINGS

FIG. 1 is a graph showing the test results of intracellular transduction efficiency of nanoparticle conducted in Experimental Example 2 of the present invention.

FIG. 2 is an image showing the results confirming nanoparticle formation conducted in Experimental Example 3 of the present invention through agarose gel analysis.

FIG. 3 is a graph showing the results evaluating nanoparticle formation conducted in Experimental Example 3 of the present invention by using Dynamic Light Scattering.

FIG. 4 is a graph showing the test results of intracellular transduction efficiency of nanoparticle conducted in Experimental Example 4 of the present invention.

FIG. 5 is a graph showing the test results of intracellular transduction efficiency of nanoparticle before and after the accelerated test conducted in Experimental Example 5 of the present invention.

CONCRETE MODE FOR CARRYING OUT THE INVENTION

The present invention will be explained in detail below.

The kit for preparing nanoparticle composition according to the present invention comprises: a first chamber comprising amphiphilic block copolymer, cationic compound and salt of polylactic acid; and a second chamber comprising effective ingredient selected from nucleic acid, polypeptide, virus or combination thereof.

The kit of the present invention consists of two or more chambers, and an end user can easily form nanoparticles only by simple mixing of the chambers. The term "simple mixing" can include all actions of "mixing," and it means that the action of mixing to form nanoparticles is not subject to any specific conditions. The mixing can be done in various manners such as dropping, vortexing, decanting, etc., but it is not limited thereto. According to an embodiment, in case of using the kit of the present invention, nanoparticles can be formed rapidly, for example, within 1 minute, within 30 seconds, or within 15 seconds, in an amount of 90% or more, 95% or more, or 99% or more of the amount that can be formed theoretically.

The effective ingredient in nanoparticle formed by end user's simple mixing can form a complex with the cationic compound through electrostatic interaction, and the complex can be encapsulated in the nanoparticle structure formed by the amphiphilic block copolymer and the salt of polylactic acid.

In the nanoparticle, in an aqueous environment, the hydrophilic part of the amphiphilic block copolymer forms the outer wall of nanoparticle, and the hydrophobic part of the amphiphilic block copolymer and the salt of polylactic acid, which is contained as a separate component from the amphiphilic block copolymer, form the inner wall of nanoparticle, and the complex of the effective ingredient and the cationic compound can be encapsulated inside the formed nanoparticle structure. Such a nanoparticle structure improves stability of the effective ingredient in blood or body fluid.

The "nucleic acid" can be, for example, DNA, RNA, siRNA, shRNA, miRNA, mRNA, aptamer, antisense oligonucleotide, or a combination thereof, but it is not limited thereto.

The "polypeptide" may mean a protein having activity in the body such as antibody or fragment thereof, cytokine, hormone or analog thereof, or a protein that can be recognized as antigen through a series of processes in the body, including polypeptide sequence of antigen, analog or precursor thereof.

The "virus" may be oncolytic virus, and for example, may be one or more selected from the group consisting of adenovirus, vaccinia virus, herpes simplex virus (HSV) and vesicular stomatitis virus (VSV). In an embodiment, the oncolytic virus is adenovirus. The adenovirus used in the concrete example of the present invention comprises luciferase gene, and it can be confirmed through imaging.

The virus can express several kinds of treatment genes in the body of the subject, and it is not limited in terms of specific molecular weight, protein, bioactivity or field of treatment. The virus for prevention can induce immunity to the target disease in the body of the subject. A composition comprising virus for preventing disease can reduce immunity induction due to the virus itself, designate or extend the target cell, and reduce hyperimmune reaction to the virus when administered again and thereby provide advantage of obtaining available effect by inoculation for several times.

In an embodiment, the particle size of the nanoparticle can be defined by Z-average value, and for example, it may be 800 nm or less, 600 nm or less, 500 nm or less, 400 nm or less, 300 nm or less, 200 nm or less, or 150 nm or less, and also may be 10 nm or more, 50 nm or more, or 100 nm or more. In a concrete embodiment, the particle size of the nanoparticle defined by Z-average value may be, for example, 10 to 800 nm, 10 to 600 nm, 10 to 500 nm, 10 to 400 nm, 10 to 300 nm, 10 to 200 nm, or 10 to 150 nm.

The "Z-average" may mean the average of hydrodynamic diameter of particle distribution measured by using Dynamic light scattering (DSL). The nanoparticle has monodisperse particle distribution, and the polydispersity index thereof may be, for example, 0.01 to 0.30, 0.05 to 0.25, or 0.1 to 0.2.

Also, in an embodiment, the surface charge of the nanoparticle may be, for example, −40 mV or more, −30 mV or more, −20 mV or more, or −10 mV or more, and also may be 40 mV or less, 30 mV or less, 20 mV or less, or 10 mV or less. In a concrete embodiment, the surface charge of the nanoparticle may be, for example, −40 to 40 mV, −30 to 30 mV, −20 to 20 mV, or −10 to 10 mV. The surface charge may be measured in an environment close to biological environment, and for example, it may be measured in 8 to 12 mM HEPES buffer (pH 7.0 to 7.5).

In case of maintaining the particle size and surface charge of the nanoparticle to the above level, it is preferable in terms of stability of nanoparticle structure, amounts of the components and absorbability in the body, and easiness of sterilization as pharmaceutical composition. For example, in case of using nucleic acid as the effective ingredient, the one or more ends of the nucleic acid may be modified with one or more selected from the group consisting of cholesterol, tocopherol and fatty acids having 10 to 24 carbon atoms. The cholesterol, tocopherol and fatty acids having 10 to 24 carbon atoms include each analogue, derivative and metabolite of the cholesterol, tocopherol and fatty acids.

The effective ingredient may be, based on the total weight of the nanoparticle formed by the kit of the present invention, for example, 30% by weight or less, 25% by weight or less, 20% by weight or less, 15% by weight or less, 10% by weight or less, or 5% by weight or less, and also may be 0.001% by weight or more, 0.01% by weight or more, 0.05% by weight or more, 0.1% by weight or more, 0.25% by weight or more, 0.5% by weight or more, or 1% by weight or more. In a concrete embodiment, the effective ingredient may be, based on the total weight of the composition, for example, 0.05 to 30% by weight, 0.1 to 25% by weight, 0.25 to 20% by weight, 0.5 to 15% by weight, 1 to 10% by weight, or 1 to 5% by weight. If the amount of the effective ingredient based on the total weight of the composition is less than the above range, the amount of delivery system used becomes too much as compared with the drug, and thus there may be a side effect due to the delivery system. If the amount of the effective ingredient is greater than the above range, the size of nanoparticle becomes too large, and thus the stability of nanoparticle may be lowered and the rate of loss during filter sterilization may increase. In case of using virus as the effective ingredient, the nanoparticle may comprise virus $1\times10^6$ to $1\times10^{14}$ VP (Virus particle), $1\times10^7$ to $1\times10^{13}$ VP, $1\times10^8$ to $1\times10^{12}$ VP, or $1\times10^9$ to $1\times10^{11}$ VP.

In a concrete embodiment, the cationic compound may be cationic lipid or cationic polymer, and more concretely, it may be cationic lipid.

In an embodiment, the cationic lipid may may be one or a combination of two or more selected from the group consisting of N,N-dioleyl-N,N-dimethylammoniumchloride (DODAC), N,N-distearyl-N,N-dimethylammoniumbromide (DDAB), N-(1-(2,3-dioleoyloxy)propyl-N,N,N-trimethyl-ammoniumchloride (DOTAP), N,N-dimethyl-(2,3-dioleoyloxy)propylamine (DODMA), N,N,N-trimethyl-(2,3-dioleoyloxy)propylamine (DOTMA), 1,2-diacyl-3-trimethylammonium-propane (TAP), 1,2-diacyl-3-dimethylammonium-propane (DAP), 3β-[N—(N',N',N'-trimethylaminoethane)carbamoyl]cholesterol (TC-cholesterol), 3β-[N—(N',N'-dimethylaminoethane)carbamoyl]cholesterol (DC-cholesterol), 3β-[N—(N'-monomethylaminoethane)carbamoyl]cholesterol (MC-cholesterol), 3β-[N-(aminoethane)carbamoyl]cholesterol (AC-cholesterol), cholesteryloxypropane-1-amine (COPA), N—(N'-aminoethane)carbamoylpropanoic tocopherol (AC-tocopherol) and N—(N'-methylaminoethane)carbamoylpropanoic tocopherol (MC-tocopherol).

In case of using such a cationic lipid, it is preferable to use polycationic lipid having high cation density in a molecule as less as possible in order to decrease toxicity induced by the cationic lipid, and more concretely, the number of the functional group in a molecule which is capable of exhibiting positive charge in an aqueous solution may be one.

Accordingly, in a more preferable embodiment, the cationic lipid may be one or more selected from the group consisting of 3β-[N—(N',N',N'-trimethylaminoethane)carbamoyl]cholesterol (TC-cholesterol), 3β-[N—(N',N'-dimethylaminoethane)carbamoyl]cholesterol (DC-cholesterol), 3β-[N—(N'-monomethylaminoethane)carbamoyl]cholesterol (MC-cholesterol), 3β-[N-(aminoethane)carbamoyl]cholesterol (AC-cholesterol), N-(1-(2,3-dioleoyloxy)propyl-N,N,N-trimethylammoniumchloride (DOTAP), N,N-dimethyl-(2,3-dioleoyloxy)propylamine (DODMA) and N,N,N-trimethyl-(2,3-dioleoyloxy)propylamine (DOTMA).

On the other hand, in an embodiment, the cationic polymer may be selected from the group consisting of chitosan, glycol chitosan, protamine, polylysine, polyarginine, polyamidoamine (PAMAM), polyethylenimine, dextran, hyaluronic acid, albumin, high molecular weight polyethylenimine (PEI), polyamine and polyvinylamine (PVAm), and more concretely, it may be one or more selected from the group consisting of polyethylenimine (PEI), polyamine and polyvinylamine (PVAm).

In a concrete embodiment, the cationic lipid may be a cationic lipid of the following Formula 1:

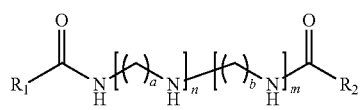

[Formula 1]

In the above formula,
each of n and m is independently 0 to 12 with the proviso that 2≤n+m≤12;
each of a and b is independently 1 to 6; and
each of $R_1$ and $R_2$ is independently selected from the group consisting of saturated and unsaturated hydrocarbon groups having 11 to 25 carbon atoms.

More concretely, in the above formula 1, each of n and m may be independently 1 to 9 with the proviso that 2≤n+m≤10.

More concretely, in the above formula 1, each of a and b may be independently 2 to 4.

More concretely, in the above formula 1, each of $R_1$ and $R_2$ may be independently selected from the group consisting of lauryl, myristyl, palmityl, stearyl, arachidyl, behenyl, lignoceryl, cerotyl, myristoleyl, palmitoleyl, sapienyl, oleyl, linoleyl, arachidonyl, eicosapentaenyl, erucyl, docosahexaenyl and cerotyl.

In an embodiment, the cationic lipid may be one or more selected from the group consisting of 1,6-dioleoyl triethylenetetramide(N,N'-((ethane-1,2-diylbis(azanediyl))bis(ethane-2,1-diyl))dioleamide), 1,8-dilinoleoyl tetraethylenepentamide ((9Z,9'Z,12Z,12'Z)-N,N'-(((azanediylbis(ethane-2,1-diyl))bis(azanediyl))bis(ethane-2,1-diyl))bis(octadeca-9,12-dienamide)), 1,4-dimyristoleoyl diethylenetriamide ((9Z,9'Z)-N,N'-(azanediylbis(ethane-2,1-diyl))bis(tetradec-9-enamide)), 1,10-distearoyl pentaethylenehexamide (N,N'-(3,6,9,12-tetraazatetradecane-1,14-diyl)distearamide), and 1,10-dioleoyl pentaethylenehexamide (N,N'-(3,6,9,12-tetraazatetradecane-1,14-diyl)dioleamide).

The amount of the cationic compound in the composition formed by the kit of the present invention may be, based on 1 part by weight of the effective ingredient, for example, 25 parts by weight or less, 20 parts by weight or less, 18 parts by weight or less, 15 parts by weight or less, 12 parts by weight or less, 10 parts by weight or less, or 8 parts by weight or less, and also may be 1 part by weight or more, 1.5 parts by weight or more, 2 parts by weight or more, 2.5 parts by weight or more, 3 parts by weight or more, or 3.5 parts by weight or more. In an embodiment, the amount of the cationic compound in the composition may be, based on 1 part by weight of the effective ingredient, 1 to 25 parts by weight, 1.5 to 10 parts by weight, 2 to 15 parts by weight, 2.5 to 10 parts by weight, or 3 to 8 parts by weight. Also, in case of using virus, more concretely adenovirus, as the effective ingredient, the amount of the cationic compound may be, based on virus $1 \times 10^{10}$ VP, 1 μg or more, 5 μg or more, 10 μg or more, 15 μg or more, or 18 μg or more, and also may be 150 μg or less, 100 μg or less, 50 μg or less, or 30 μg or less, and for example, it may be 1 μg to 150 μg, 5 μg to 100 μg, 10 μg to 50 μg, or 15 μg to 30 μg. If the amount of the cationic compound in the composition is less than the above range, a stable complex with the effective ingredient may not be formed. If the amount of the cationic compound in the composition is greater than the above range, the size of nanoparticle becomes too large, and thus the stability of nanoparticle may be lowered and the rate of loss during filter sterilization may increase.

In case of using nucleic acid as the effective ingredient, the cationic compound and the nucleic acid are combined together through electrostatic interaction to form a complex. In an embodiment, the ratio of quantities of electric charge of the cationic compound (N) and the nucleic acid (P) (N/P: the ratio of the positive electric charge of the cationic compound to the negative electric charge of the nucleic acid) may be 0.5 or more, 1 or more, 2 or more, or 3.5 or more, and also may be 100 or less, 50 or less, or 20 or less, and for example, it may be 0.5 to 100, 1 to 50, 2 to 20, 5 to 15, or 7 to 12. If the ratio (N/P) is less than the above range, it may be difficult to form a complex comprising a sufficient amount of nucleic acid. If the ratio (N/P) is greater than the above range, toxicity may be induced. In addition, the N/P ratio may act importantly for expression of the effective ingredient specifically in spleen.

In a concrete embodiment, the amphiphilic block copolymer may be an A-B type block copolymer comprising a hydrophilic A block and a hydrophobic B block. The A-B type block copolymer forms core-shell type polymer nanoparticle wherein in an aqueous phase the hydrophobic B block forms the core (inner wall) and the hydrophilic A block forms the shell (outer wall).

In an embodiment, the hydrophilic A block may be one or more selected from the group consisting of polyalkylene glycol, polyvinyl alcohol, polyvinyl pyrrolidone, polyacrylamide, and derivatives thereof.

More concretely, the hydrophilic A block may be one or more selected from the group consisting of monomethoxy polyethylene glycol, monoacetoxy polyethylene glycol, polyethylene glycol, a copolymer of polyethylene and propylene glycol, and polyvinyl pyrrolidone.

In an embodiment, the hydrophilic A block may have a number average molecular weight of 200 to 50,000 Daltons, more concretely 1,000 to 20,000 Daltons, and still more concretely 1,000 to 5,000 Daltons.

In addition, if necessary, a functional group capable of reaching specific tissue or cell, a ligand, or a functional group capable of promoting intracellular delivery may be chemically bound to the end of the hydrophilic A block so as to control the in vivo distribution of the polymer nanoparticle delivery system formed by the amphiphilic block copolymer and the salt of polylactic acid, or to increase the efficiency of transduction of the nanoparticle delivery system into cells. In an embodiment, the functional group or ligand may be one or more selected from the group consisting of monosaccharides, polysaccharides, vitamins, peptides, proteins, and antibodies to cell surface receptors. More concretely, the functional group or ligand may be one or more selected from the group consisting of anisamide, vitamin B9 (folic acid), vitamin B12, vitamin A, galactose, lactose, mannose, hyaluronic acid, RGD peptide, NGR peptide, transferrin, antibody to transferrin receptor, etc.

The hydrophobic B block is a biocompatible and biodegradable polymer, and in an embodiment, it may be one or more selected from the group consisting of polyester, polyanhydride, polyamino acid, polyorthoester and polyphosphazine.

More concretely, the hydrophobic B block may be one or more selected from the group consisting of polylactide, polyglycolide, polycaprolactone, polydioxane-2-one, a copolymer of polylactide and glycolide, a copolymer of polylactide and polydioxane-2-one, a copolymer of polylactide and polycaprolactone, and a copolymer of polyglycolide and polycaprolactone.

In an embodiment, the hydrophobic B block may have a number average molecular weight of 50 to 50,000 Daltons, more concretely 200 to 20,000 Daltons, and still more concretely 1,000 to 5,000 Daltons.

Also, in an embodiment, to improve the stability of the nanoparticle by increasing hydrophobicity of the hydrophobic B block, the hydroxyl group at the end of the hydrophobic B block may be modified by chemically combining with tocopherol, cholesterol, or fatty acid having 10 to 24 carbon atoms.

In an embodiment, regarding the compositional ratio of the hydrophilic block (A) and hydrophobic block (B) in the amphiphilic block copolymer, the amount of the hydrophilic block (A) may be 40 to 70% by weight, and more concretely 50 to 60% by weight, based on the total weight of the copolymer. If the amount of the hydrophilic block (A) is less than 40% by weight based on the total weight of the copolymer, solubility of the polymer in water is low, and thus it may be difficult to form a nanoparticle. Thus, it is advantageous that the amount of the hydrophilic block (A) is 40% by weight or greater so that the copolymer can have a solubility in water sufficient to form a nanoparticle. If the amount of the hydrophilic block (A) is greater than 70% by weight based on the total weight of the copolymer, hydrophilicity becomes too high and thus the stability of the polymer nanoparticle may be lowered and it may be difficult to use as a composition for solubilizing the effective ingredient/cationic compound complex. Thus, considering stability of the nanoparticle, it is advantageous that the amount of the hydrophilic block (A) is 70% by weight or less.

In an embodiment, the salt of polylactic acid in the composition formed by the kit of the present invention is distributed in the core (inner wall) of the nanoparticle, and acts to stabilize the nanoparticle by strengthening the hydrophobicity of the core, and at the same time, to effectively avoid reticuloendothelial system (RES) in the body. That is, the carboxylic anion in the salt of polylactic acid binds to the cationic complex more efficiently than a polylactic acid, and decreases the surface potential of the polymer nanoparticle. Thereby, positive charge of the surface potential of the polymer nanoparticle becomes less than that of a polymer nanoparticle which does not contain a salt of polylactic acid, and thus it may be less captured by reticuloendothelial system and efficiently delivered to target sites (e.g., cancer cells, inflammatory cells, etc.).

In an embodiment, the salt of polylactic acid—which is contained as a separate ingredient from the amphiphilic block copolymer—is a component of the inner wall of the nanoparticle, and may have a number average molecular weight of 500 to 50,000 Daltons, and more concretely 1,000 to 10,000 Daltons. If the molecular weight of the salt of polylactic acid is less than 500 Daltons, the hydrophobicity becomes too low and thus the salt of polylactic acid may not easily exist at the core (inner wall) of the nanoparticle. If the molecular weight of the salt of polylactic acid is greater than 50,000 Daltons, the size of the polymer nanoparticle may become too large.

In an embodiment, the end of the salt of polylactic acid (e.g., sodium salt of polylactic acid) opposite to the end of carboxylic acid-metal (e.g., carboxylic acid-sodium) may be substituted with one selected from the group consisting of hydroxyl, acetoxy, benzoyloxy, decanoyloxy, palmitoyloxy, and alkoxy having 1 to 2 carbon atoms.

In an embodiment, the salt of polylactic acid may be one or more selected from the group consisting of the compounds of the following Formulas 2 to 7 (wherein "COO" means carboxylic group, i.e., "C(=O)O"):

RO—CHZ-[A]$_n$-[B]$_m$—COOM  [Formula 2]

In Formula 2 above, A is —COO—CHZ—; B is —COO—CHY—, —COO—CH$_2$CH$_2$CH$_2$CH$_2$CH$_2$— or —COO—CH$_2$CH$_2$OCH$_2$; R is a hydrogen atom, or acetyl, benzoyl, decanoyl, palmitoyl, methyl or ethyl; each of Z and Y is a hydrogen atom, or methyl or phenyl; M is Na, K or Li; n is an integer of from 1 to 30; and m is an integer of from 0 to 20.

RO—CHZ—[COO—CHX]$_p$—[COO—CHY']$_q$—COO—CHZ—COOM  [Formula 3]

In Formula 3 above, X is methyl; Y' is a hydrogen atom or phenyl; p is an integer of from 0 to 25, q is an integer of from 0 to 25, with the proviso that p+q is an integer of from 5 to 25; R is a hydrogen atom, or acetyl, benzoyl, decanoyl, palmitoyl, methyl or ethyl; M is Na, K or Li; and Z is a hydrogen atom, methyl or phenyl.

RO—PAD-COO—W-M'  [Formula 4]

In Formula 4 above, W-M' is

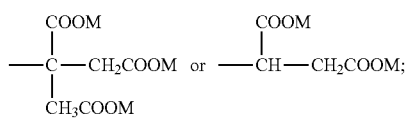

PAD is selected from the group consisting of D,L-polylactic acid, D-polylactic acid, polymandelic acid, copolymer of D,L-lactic acid and glycolic acid, copolymer of D,L-lactic acid and mandelic acid, copolymer of D,L-lactic acid and caprolactone, and copolymer of D,L-lactic acid and 1,4-dioxane-2-one; R is a hydrogen atom, or acetyl, benzoyl, decanoyl, palmitoyl, methyl or ethyl; and M is independently Na, K or Li.

$$S\text{—}O\text{—}PAD\text{—}COO\text{—}Q \qquad \text{[Formula 5]}$$

In Formula 5 above, S is

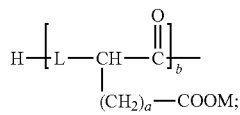

L is —NR$_1$— or —O—, wherein R$_1$ is a hydrogen atom or C$_{1-10}$ alkyl; Q is —CH$_3$, —CH$_2$CH$_3$, —CH$_2$CH$_2$CH$_3$, —CH$_2$CH$_2$CH$_2$CH$_3$, or —CH$_2$C$_6$H$_5$; a is an integer of from 0 to 4; b is an integer of from 1 to 10; M is Na, K or Li; and PAD is one or more selected from the group consisting of D,L-polylactic acid, D-polylactic acid, polymandelic acid, copolymer of D,L-lactic acid and glycolic acid, copolymer of D,L-lactic acid and mandelic acid, copolymer of D,L-lactic acid and caprolactone, and copolymer of D,L-lactic acid and 1,4-dioxane-2-one.

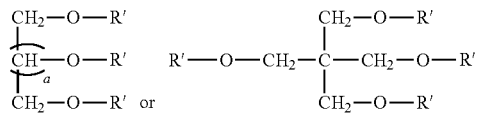

[Formula 6]

In Formula 6 above, R' is —PAD-O—C(O)—CH$_2$CH$_2$—C(O)—OM, wherein PAD is selected from the group consisting of D,L-polylactic acid, D-polylactic acid, polymandelic acid, copolymer of D,L-lactic acid and glycolic acid, copolymer of D,L-lactic acid and mandelic acid, copolymer of D,L-lactic acid and caprolactone, and copolymer of D,L-lactic acid and 1,4-dioxane-2-one, M is Na, K or Li; and a is an integer of from 1 to 4.

$$YO\text{—}[\text{—}C(O)\text{—}(CHX)_a\text{—}O\text{—}]_m\text{—}C(O)\text{—}R\text{—}C(O)\text{—}[\text{—}O\text{—}(CHX')_b\text{—}C(O)\text{—}]_n\text{—}OZ \qquad \text{[Formula 7]}$$

In Formula 7 above, X and X' are independently hydrogen, C$_{1-10}$ alkyl or C$_{6-20}$ aryl; Y and Z are independently Na, K or Li; m and n are independently an integer of from 0 to 95, with the proviso that 5<m+n<100; a and b are independently an integer of from 1 to 6; and R is —(CH$_2$)$_k$—, C$_{2-10}$ divalent alkenyl, C$_{6-20}$ divalent aryl or a combination thereof, wherein k is an integer of from 0 to 10.

In an embodiment, the salt of polylactic acid may be a compound of Formula 2 or Formula 3.

In an embodiment, in order to increase the intracellular transduction efficiency of mRNA, the kit of the present invention may further comprise fusogenic lipid in an amount of 0.01 to 50% by weight, more concretely 0.1 to 10% by weight, based on total weight of the composition formed by the kit of the present invention.

The fusogenic lipid, when it is mixed with the complex of mRNA and the cationic lipid, is combined with the complex by hydrophobic interaction to form a complex of mRNA, the cationic lipid and the fusogenic lipid, and the complex containing the fusogenic lipid is encapsulated inside the nanoparticle structure of the amphiphilic block copolymer.

In an embodiment, the fusogenic lipid may be one or a combination of two or more selected from the group consisting of phospholipid, cholesterol and tocopherol.

More concretely, the phospholipid may be one or more selected from the group consisting of phosphatidylethanolamin (PE), phosphatidylcholine (PC) and phosphatidic acid. The phosphatidylethanolamin (PE), phosphatidylcholine (PC) and phosphatidic acid may be in a form combined with one or two C$_{10-24}$ fatty acids. The cholesterol and tocopherol include analogues, derivatives and metabolites of each of the cholesterol and tocopherol.

Still more concretely, the fusogenic lipid may be one or a combination of two or more selected from the group consisting of dilauroyl phosphatidylethanolamine, dimyristoyl phosphatidylethanolamine, dipalmitoyl phosphatidylethanolamine, distearoyl phosphatidylethanolamine, dioleoyl phosphatidylethanolamine (DOPE), 1,2-dipalmitoleoyl-sn-glycero-3-phosphoethanolamine (DPPE), dilinoleoyl phosphatidylethanolamine, 1-palmitoyl-2-oleoyl phosphatidylethanolamine, 1,2-diphytanoyl-3-sn-phosphatidylethanolamine, 1,2-dipalmitoleoyl-sn-glycero-3-phosphocholine (DPPC), 1,2-dioleoyl-sn-glycero-3-phosphocholine (DOPC), dilauroyl phosphatidylcholine, dimyristoyl phosphatidylcholine, dipalmitoyl phosphatidylcholine, distearoyl phosphatidylcholine, dioleoyl phosphatidylcholine, dilinoleoyl phosphatidylcholine, 1-palmitoyl-2-oleoyl phosphatidylcholine, 1,2-diphytanoyl-3-sn-phosphatidylcholine, dilauroyl phosphatidic acid, dimyristoyl phosphatidic acid, dipalmitoyl phosphatidic acid, distearoyl phosphatidic acid, dioleoyl phosphatidic acid, dilinoleoyl phosphatidic acid, 1-palmitoyl-2-oleoyl phosphatidic acid, 1,2-diphytanoyl-3-sn-phosphatidic acid, cholesterol and tocopherol.

Still more concretely, the fusogenic lipid may be one or more selected from the group consisting of dioleoyl phosphatidylethanolamine (DOPE), 1,2-dipalmitoleoyl-sn-glycero-3-phosphocholine (DPPC), 1,2-dioleoyl-sn-glycero-3-phosphocholine (DOPC) and 1,2-dipalmitoleoyl-sn-glycero-3-phosphoethanolamine (DPPE).

In an embodiment, among the components in the composition formed by the kit of the present invention, the amount of the amphiphilic block copolymer comprising the hydrophilic block (A) and the hydrophobic block (B) may be 0.01 to 50 parts by weight, 0.01 to 30 parts by weight, 0.01 to 15 parts by weight, 0.01 to 12 parts by weight, 0.1 to 50 parts by weight, 0.1 to 30 parts by weight, 0.1 to 15 parts by weight, 0.1 to 12 parts by weight, 0.5 to 50 parts by weight, 0.5 to 30 parts by weight, 0.5 to 15 parts by weight, 0.5 to 12 parts by weight, 1 to 50 parts by weight, 1 to 30 parts by weight, 1 to 15 parts by weight, or 1 to 12 parts by weight, based on 1 part by weight of the cationic compound.

More concretely, the amount of the amphiphilic block copolymer may be adjusted within the above range according to the effective ingredient. For example, in case of using virus as the effective ingredient, the amount of the amphiphilic block copolymer may be 3 to 7 parts by weight, based on 1 part by weight of the cationic compound, and in other embodiment, in case of using nucleic acid as the effective ingredient, the amount of the amphiphilic block copolymer may be 0.7 to 7 parts by weight, 1 to 5 parts by weight, or 1 to 3 parts by weight, based on 1 part by weight of the cationic compound.

In an embodiment, among the components in the composition formed by the kit of the present invention, the amount of the salt of polylactic acid may be 0.1 to 100 parts by weight, 0.1 to 80 parts by weight, 0.1 to 50 parts by weight, 0.1 to 30 parts by weight, 0.1 to 10 parts by weight, 0.1 to 5 parts by weight, 0.5 to 100 parts by weight, 0.5 to 80 parts by weight, 0.5 to 50 parts by weight, 0.5 to 30 parts by weight, 1 to 100 parts by weight, 1 to 80 parts by weight, 1 to 50 parts by weight, 1 to 30 parts by weight, 2 to 100 parts by weight, 2 to 80 parts by weight, 2 to 50 parts by weight, or 2 to 30 parts by weight, based on 1 part by weight of the cationic compound.

More concretely, the amount of the salt of polylactic acid may be adjusted within the above range according to the effective ingredient. For example, in case of using virus as the effective ingredient, the amount of the salt of polylactic acid may be 3 to 15 parts by weight, based on 1 part by weight of the cationic compound, and in other embodiment, in case of using nucleic acid as the effective ingredient, the amount of the salt of polylactic acid may be 0.2 to 4 parts by weight, 1 to 4 parts by weight, or 0.2 to 0.8 part by weight, based on 1 part by weight of the cationic compound.

In an embodiment, the first chamber and/or the second chamber may further comprise aqueous solution, water miscible organic solvent, or a combination thereof. The "aqueous solution" may be used for the same meaning as water solution, and may mean, for example, water, sterilized water, buffer solution, injection solution, etc., and it may be a buffer solution further comprising organic acid. The aqueous solution may be, for example, citric acid buffer, PBS buffer, etc., but it is not limited thereto. The "water miscible organic solvent" may be C1 to C4 lower alcohol, acetone, acetonitrile, a water mixture thereof or a mixture thereof, but it is not limited thereto.

In an embodiment, the mixture of the amphiphilic block copolymer, cationic compound and salt of polylactic acid contained in the first chamber may be that filtered one or more times with hydrophilic filter after the mixing, and used as the content of the first chamber. The material of the hydrophilic filter may be, for example, nylon, mixed cellulose ester (MCE), polyethylsulfone (PES), polyvinylidene difluoride (PVDF), cellulose acetate (CA), polytetrafluoroethylene (PTFE), or a mixture thereof, but it is not limited thereto. In case of being subject to hydrophilic filtering, the effective ingredient may be entrapped in nanoparticle more successfully, and the stability of nanoparticle may increase.

In an embodiment, the second chamber may further comprise a stabilizing agent suitable for improving stability of the effective ingredient. The stabilizing agent may include pH adjusting agent, inorganic salt, saccharide, surfactant, chelating agent, etc., but it is not limited thereto. The "saccharide" may mean monosaccharide, disaccharide, sugar alcohol which is reduced sugar thereof, and polymer of single or mixed polysaccharides, etc., and the polysaccharide may mean tri- or more saccharide. For example, the monosaccharide may be mannose, glucose, arabinose, fructose, galactose, etc.; the disaccharide may be sucrose, trehalose, maltose, lactose, cellobiose, gentiobiose, isomaltose, melibose, etc.; the sugar alcohol may be mannitol, sorbitol, xylitol, erythritol, maltitol, etc.; and the polysaccharide may be raffinose, dextran, starch, hydroxyethyl starch, cyclodextrin, cellulose, hetastarch, oligosaccharide, etc. but it is not limited thereto. The "pH adjusting agent" may be Tris, glycine, histidine, glutamate, succinate, phosphate, acetate, aspartate, or a combination thereof, and the "surfactant" may be sodium lauryl sulfate, dioctyl sodium sulfosuccinate, dioctyl sodium sulfonate, chenodeoxycholic acid, N-lauroylsarcosine sodium salt, lithium dodecyl sulfate, 1-octanesulfonic acid sodium salt, sodium cholate hydrate, sodium deoxycholate, glycodeoxycholic acid sodium salt, benzalkonium chloride, Triton X-100, Triton X-114, lauromacrogol 400, polyoxyl 40 stearate, polysorbate 20, 40, 60, 65 or 80, or a combination thereof, but it is not limited thereto. The "chelating agent" may be citric acid, polyphenolic acid, EDTA, DTPA, EDDHA, or a combination thereof, but it is not limited thereto. The "inorganic salt" means a salt of monovalent or divalent metal and may be NaCl, KCl, $MgCl_2$, $CaCl_2$, $MgSO_4$, $CaSO_4$, $CaCO_3$, $MgCO_3$, etc., but it is not limited thereto.

For example, in case of using virus as the effective ingredient, the second chamber may further comprise 5 to 15 mM Tris, 5 to 15 mM histidine, 50 to 90 mM NaCl, 2 to 8% sucrose (w/v), 0.5 to 1.5 mM $MgCl_2$, 0.005 to 0.05% (w/v) PS-80, 0.05 to 0.15 mM EDTA, and 0.1 to 1.0% ethanol (v/v), and the pH may be 7.0 to 8.0. In other embodiment, in case of using nucleic acid as the effective ingredient, the second chamber may further comprise PBS buffer, for example, a solution comprising 2.0 to 3.5 mM KCl, 1.0 to 2.5 mM $KH_2PO_4$, 125 to 145 mM NaCl and 7.5 to 9.5 mM $Na_2HPO_4$ with PH 7.0 to pH 8.0.

The "chamber" may be any one suitable for containing the materials of nanoparticle or solvent comprising them such as glass, plastic, paper, pack, etc., but it is not limited thereto.

The present invention will be explained below in more detail with reference to the following Examples. However, the Examples are only to illustrate the invention, and the scope of the present invention is not limited thereby in any manner.

EXAMPLES

Preparation Example 1: Preparation of the First Chamber Composition Containing dioTETA/mPEG-PLA-Tocopherol (2k-1.7k)/PLANa (1.7k) and Nanoparticle Formation Therefrom (1) Preparation of the First Chamber Composition 20 mg of 1,6-dioleoyl triethylenetetramide (dioTETA) was dissolved in 1 ml of ethanol, 50 mg of monomethoxypolyethylene glycol-polylactide-tocopherol copolymer (mPEG-PLA-tocopherol) (2k-1.7k) was dissolved in 1 ml of 90% ethanol, and 50 mg of sodium salt of polylactic acid (PLANa) (1.7k) was dissolved in 1 ml of 50% ethanol. The dioTETA, mPEG-PLA-tocopherol (2k-1.7k) and PLANa (1.7k) were mixed according to the ratio shown in the following Table 1, and 30 times of PBS was then admixed to prepare a complex emulsion. The prepared composition was filtered with 0.22 μm hydrophilic filter (Table 1).

TABLE 1

| First chamber composition | Ratio | dioTETA | mPEG-PLA-tocopherol | PLANa |
|---|---|---|---|---|
| Example 1 | 20/25/50 | 20 μg | 25 μg | 50 μg |
| Example 2 | 20/50/100 | 20 μg | 50 μg | 100 μg |
| Example 3 | 20/100/100 | 20 μg | 100 μg | 100 μg |
| Example 4 | 20/100/200 | 20 μg | 100 μg | 200 μg |

(2) Preparation of the Second Chamber Composition Containing Oncolytic Virus

VQAd CMV Luc virus (ViraQuest, Lot #: 33088) was counted to $1 \times 10^{10}$ VP and prepared as an aliquot form in A195 buffer (10 mM Tris, 10 mM histidine, 75 mM NaCl, 5% sucrose (w/v), 1 mM $MgCl_2$, 0.02% (w/v) PS-80, 0.1 mM EDTA, 0.5% ethanol (v/v), pH 7.4).

(3) Preparation of Nanoparticle

The first chamber composition and the second chamber composition were mixed by vortexing for 10 to 15 seconds just before use, to form nanoparticle.

Experimental Example 1: Confirmation of Formation of Nanoparticle Containing Oncolytic Virus By mixing the first chamber composition and the second chamber composition just before use, it was confirmed whether nanoparticles of Examples 1 to 4 were formed normally.

As a result, no precipitation was observed in all of Examples 1 to 4 even with simple mixing, and thus normal formation of nanoparticle was confirmed.

Experimental Example 2: Evaluation of Intracellular Transduction Efficiency of Nanoparticle Containing Oncolytic Virus In order to evaluate intracellular transduction efficiency of nanoparticle, MDA-MB435 cell with low CAR expression suitable for evaluating virus transduction efficiency was prepared. By mixing the first chamber composition and the second chamber composition just before intracellular injection, nanoparticles of Examples 1 to 4 were formed, and aliquoted to the cell in an amount corresponding to 500 moi based on virus. After further incubation for 15 to 24 hours, luciferin was added to the cell and the amount of expressed luciferase was measured. As a control group, non-nanoparticle virus (naked Ad; Ad) was used. The results are shown in FIG. 1.

As a result, it was observed that, as compared with the control group, all of the tested nanoparticles of the Examples showed higher intracellular transduction efficiency.

Preparation Example 1: Preparation of the First Chamber Composition Containing dioTETA/mPEG-PLA (2k-1.7k)/PLANa (1.7k) and Nanoparticle Formation Therefrom (1) Preparation of the First Chamber Composition 20 mg of dioTETA was dissolved in 1 ml of sodium acetate buffer (pH 4.6), 10 mg of monomethoxypolyethylene glycol-polylactide copolymer (mPEG-PLA) (2k-1.7k) was dissolved in 1 ml of water, and 10 mg of PLANa (1.7k) was dissolved in 1 ml of water. The dioTETA, mPEG-PLA (2k-1.7k) and PLANa (1.7k) were mixed according to the ratio shown in the following Table 2, and the mixture was filtered with 0.22 μm hydrophilic filter (Table 2).

TABLE 2

| First chamber composition | N/P ratio | Ratio (mole) dioTETA:mPEG-PLA:PLANa | dioTETA (μg) | mPEG-PLA (μg) | PLANa (μg) |
|---|---|---|---|---|---|
| Example 5 | 6 | 1:0.5:0.1 | 60.7 | 166.3 | 15.3 |
| Example 6 | 6 | 1:0.5:0.5 | 60.7 | 166.3 | 76.4 |
| Example 7 | 9 | 1:0.5:0.1 | 166.3 | 249.4 | 22.9 |
| Example 8 | 9 | 1:0.5:0.5 | 166.3 | 249.4 | 114.7 |

(2) Preparation of the Second Chamber Composition Containing mRNA

The second chamber composition was prepared by dissolving 10 μg CleanCap® FireFly Luciferase mRNA (5-methoxyuridine) (TriLink, Catalog L-7202) in PBS (PH 7.4, 2.67 mM KCl, 1.47 mM $KH_2PO_4$, 136.9 mM NaCl, 8.1 mM $Na_2HPO_4$).

(3) Preparation of Nanoparticle

The first chamber composition and the second chamber composition were mixed by vortexing for 10 to 15 seconds just before use, to form nanoparticle.

Experimental Example 3: Confirmation of Formation of mRNA Nanoparticle

By mixing the first chamber composition and the second chamber composition just before use, it was confirmed whether nanoparticles of Examples 5 to 8 were formed while combining with mRNA. By using agarose gel retardation assay (1.5% agarose; DyneGelSafe Kit), mRNA complexation was measured and the results are shown in FIG. 2. Also, the results of particle size measurement using DLS in order to confirm nanoparticle formation are shown in FIG. 3. Based on the gel retardation assay results in comparison with free mRNA and the DLS results, it was confirmed that mRNA complex nanoparticles were formed in all of Examples 5 to 8.

Experimental Example 4: Evaluation of Intracellular Transduction Efficiency of Nanoparticle Containing mRNA In order to evaluate intracellular transduction efficiency of the generated nanoparticle, A549 human lung cancer cell was prepared. By mixing the first chamber composition and the second chamber composition just before intracellular injection, nanoparticles corresponding to Examples 6 to 8 were formed, and aliquoted to the cell in an amount corresponding to 250 ng mRNA based on 96 well. After further incubation for 6 hours, luciferin was added to the cell and the amount of expressed luciferase was measured. As a control group, a commercial reagent, TransIT®-mRNA Kit (Mirus Bio) was used. The results are shown in FIG. 4. As a result, it was observed that, as compared with the control group, the tested nanoparticles of the Examples showed similar level of intracellular transduction efficiency.

Experimental Example 5: Comparison of Intracellular Transduction Efficiency According to Stability of Nanoparticle Containing mRNA In order to confirm higher intracellular transduction efficiency of nanoparticle prepared by the kit just before use due to stability of the nanoparticle, HepG2 cell was prepared, and the intracellular transduction efficiencies were compared by accelerated test. By mixing the first chamber composition and the second chamber composition just before intracellular injection, nanoparticles corresponding to Example 6 were formed, and aliquoted to the cell in an amount corresponding to 250 ng mRNA based on 96 well. As comparative groups, nanoparticles prepared in the same manner and nanoparticles prepared by using a conventional transfection agent, L3K were stored at 42° C. for 1 hour and used, and they were aliquoted to the cell in the same manner. After further incubation for 15 hours, luciferin was added to the cell and the amount of expressed luciferase was measured. The results are shown in FIG. 5. As a result, it was confirmed that the stability was lowered by the accelerated test after the preparation, and thus the intracellular transduction efficiency decreased rapidly.

The invention claimed is:

1. A kit for preparing a nanoparticle composition, comprising:
    a first chamber comprising an amphiphilic block copolymer, a cationic compound and a salt of polylactic acid; wherein the first chamber is capable of forming nanoparticles having a particle size of 80 to 400 nm; and
    a second chamber comprising an effective ingredient which is a nucleic acid;
    wherein the amount of the amphiphilic block copolymer is 0.5 to 12 parts by weight, based on 1 part by weight of the cationic compound; and
    wherein the amount of the salt of polylactic acid is 0.2 to 0.8 parts by weight, based on 1 part by weight of the cationic compound.

2. The kit for preparing the nanoparticle composition of claim 1, which is to form nanoparticles for intracellular delivery of the effective ingredient.

3. The kit for preparing the nanoparticle composition of claim 1, wherein one or more selected from the group consisting of the first chamber and the second chamber further comprise additional solvent.

4. The kit for preparing the nanoparticle composition of claim 3, wherein the solvent is aqueous solvent, water miscible solvent, or a mixture thereof.

5. The kit for preparing the nanoparticle composition of claim 1, wherein the second chamber further comprises pH adjusting agent, inorganic salt, saccharide, surfactant, chelating agent, or a combination thereof.

6. The kit for preparing the nanoparticle composition of claim 1, wherein the mixture of the amphiphilic block copolymer, cationic compound and salt of polylactic acid in the first chamber is that filtered one or more times with hydrophilic filter after the mixing.

7. The kit according to claim 1, wherein:
    a) said amphiphilic block copolymer is an A-B type block copolymer comprising a hydrophilic A block and a hydrophobic B block; and
    b) said cationic compound is cationic lipid or a cationic polymer.

8. The kit according to claim 7, wherein
    a) said hydrophilic A block is at least one member selected from the group consisting of polyalkylene glycol, polyvinyl alcohol, polyvinyl pyrrolidone, polyacrylamide, and derivatives thereof; and
    b) said hydrophobic B block is at least one member selected from the group consisting of polyester, polyanhydride, polyamino acid, polyorthoester and polyphosphazine.

9. The kit according to claim 8, wherein said hydrophobic B block is at least one member selected from the group consisting of polylactide, polyglycolide, polycaprolactone, polydioxane-2-one, a copolymer of polylactide and glycolide, a copolymer of polylactide and polydioxane-2-one, a copolymer of polylactide and polycaprolactone, and a copolymer of polyglycolide and polycaprolactone.

10. The kit according to claim 1, wherein said nanoparticles have a particle size of 100 to 150 nm.

11. The kit according to claim 1, wherein
    a) said amphiphilic block copolymer is monomethoxy-polyethylene glycol-polylactide tocopherol copolymer (mPEG-PLA);
    b) said cationic compound is 1,6-dioleoyl triethlenetetramide (dioTETA); and
    c) said salt of polylactic acid is a sodium salt of polylactic acid (PLANa).

12. The kit according to claim 11, wherein a) the amount of the amphiphilic block copolymer is 5.5 parts by weight, based on 1 part by weight of the cationic compound; and b) wherein the amount of the salt of polylactic acid is 0.3 parts by weight, based on 1 part by weight of the cationic compound.

* * * * *